Dec. 27, 1960     I. O. JOHANSSON     2,966,079
TOOL MACHINE BRAKE MECHANISM
Filed June 11, 1959     5 Sheets-Sheet 1
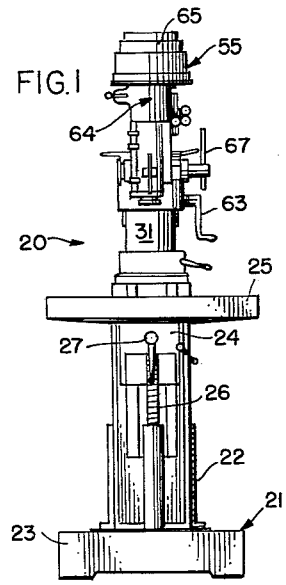
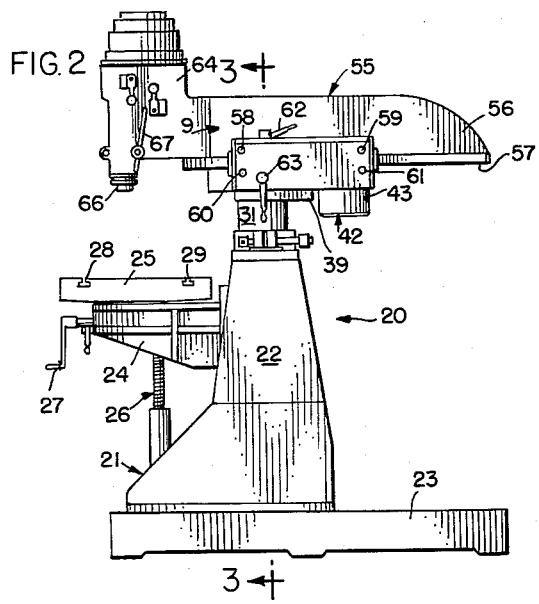
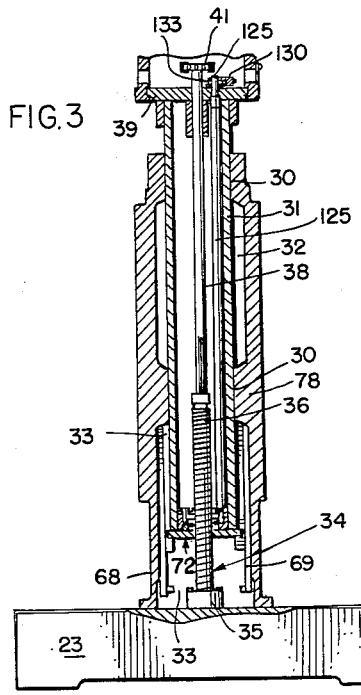
INVENTOR:
INGVAR O. JOHANSSON
BY
ATT'Y Dec. 27, 1960     I. O. JOHANSSON     2,966,079

TOOL MACHINE BRAKE MECHANISM

Filed June 11, 1959     5 Sheets-Sheet 2

*INVENTOR:*
INGVAR O. JOHANSSON
BY Sherman R. Barnett
ATT'Y

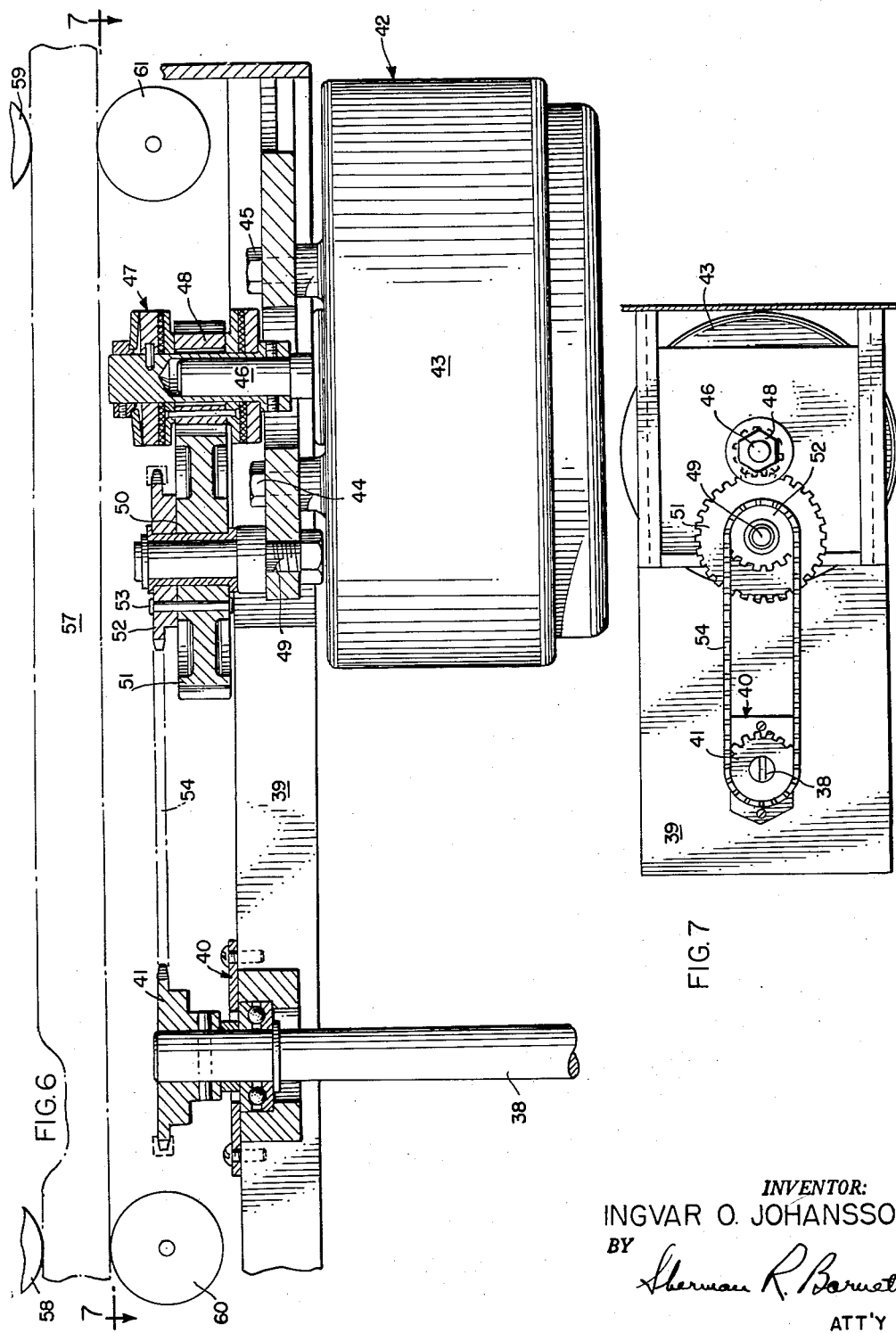

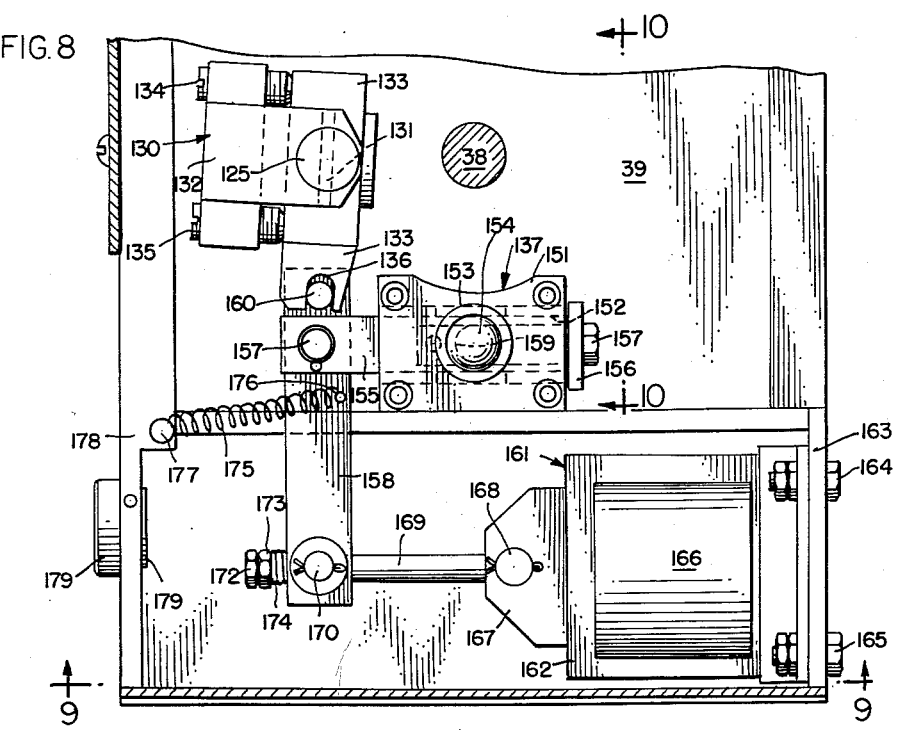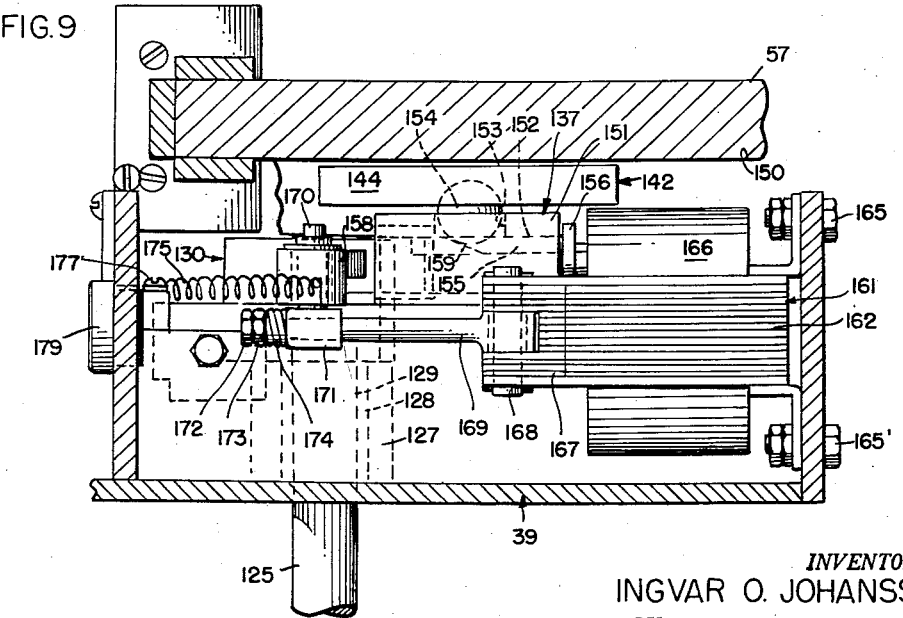

Dec. 27, 1960     I. O. JOHANSSON     2,966,079
TOOL MACHINE BRAKE MECHANISM

Filed June 11, 1959     5 Sheets-Sheet 5

INVENTOR:
INGVAR O. JOHANSSON
BY
ATT'Y

United States Patent Office 2,966,079
Patented Dec. 27, 1960

2,966,079

TOOL MACHINE BRAKE MECHANISM

Ingvar O. Johansson, 7248 St. Louis Ave., Skokie, Ill.

Filed June 11, 1959, Ser. No. 819,744

15 Claims. (Cl. 77—28)

This invention relates to a brake mechanism for selectively locking certain movable components of tool machines. More in particular this invention relates to a brake mechanism for simultaneously locking one normally rotatable component against rotation and locking another linearly movable component against movement thereof.

In certain types of machining operations it is desirable and often necessary to move the cutting element away from the workpiece so that the debris from the cutting operation may be removed therefrom. In most power driven machining apparatus either the mounted cutting element or the mounted workpiece or both may be moved in any one or more of the three physical dimensions. Particularly in the case where the cutting element must be cleansed of debris periodically during the operation, it is desirable to restrict movement in at least one direction so that upon return to cutting position unnecessary time consuming adjustments for re-alinement can be avoided.

One type of machine tool to which this invention is directed though not limited thereto may be in the form of a drill press. Such press may include a stationary frame supporting a vertically disposed rotatable cylindrical column. The column may be moved vertically in the direction of the axis thereof. On the top of the column is mounted a support member which carries a ram, the ram being movable in a lateral direction. The ram includes the drill head and power means for rotating the drill. Thus the drill can be moved vertically, laterally and arcuately with respect to a workpiece mounted on the bed of the press.

Particularly in the case of drilling a deep bore in a workpiece the drill must be withdrawn periodically from the partially drilled bore in order to remove the accumulation of metal cuttings from the drill. No unusual problem occurs in the operation until the depth of the bore reaches a point where the lower vertical limit of the drill head on the ram is reached. In order to drill deeper it then becomes necessary to lower the column. This necessitates adjustment to re-aline the drill with the bore because when the column is released for lowering it permits rotative movement whereby the drill may move arcuately. After such re-alinement and lowering of the column, drilling may again proceed until the drill is in need of cleaning. At this point the drill may not be withdrawn completely because the upper limit of the vertically movable drill head or spindle will be reached prior to its full withdrawal. This again necessitates the raising of the column sufficiently to permit withdrawal of the drill from the partial bore and then lowering it to a new position lower than before with its accompanying requirement of adjusting for realinement. This step must be repeated for each drill cleaning after the drilling operation has proceeded to a depth exceeding the limits of vertical movement of the drill spindle with respect to the column. From this it is evident that deep bore drilling operations according to known methods are time consuming, cumbersome and inefficient use of machine capacity resulting in a disproportionate increase in cost as compared with shallow boring operations. Furthermore, the cost increase is augmented when the workpiece requires a plurality of deep bores requiring lateral movement of the ram.

It is therefore a principal object of this invention to provide means for simultaneously locking against motion a laterally movable component and a rotatable component of a tool machine.

A further object of this invention is to provide means for simultaneously locking a laterally movable component against lateral movement and an axially and rotatable component against rotation thereof in a machine tool.

A still further object of this invention is to provide means for simultaneously locking the ram of a drill press against lateral movement thereof and the column of the drill press against rotative movement thereof.

A yet further object of this invention is to provide means for simultaneously locking the ram of a drill press against lateral movement thereof and the column of the drill press against rotative movement thereof without restriction of axial movement of the column.

Another object of this invention is to provide means for releasably securing against lateral movement the ram of a drill press and releasably securing against rotative movement the column of a drill press without affecting or restricting vertical movement of the column.

These and other important objects inherent in and encompassed by the invention will be more readily understood from the ensuing description of a preferred embodiment, the appended claims and the annexed drawings wherein:

Figure 1 is a front elevation of a drill press including this invention.

Figure 2 is a side elevation of a drill press embodying this invention.

Figure 3 is a vertical sectional view of the drill press column, as taken on line 3—3 of Figure 2, with the ram portion partly broken away, to show the general arrangement of the column elevating mechanism.

Figure 6 is an enlarged view, partly in section, of the power mechanism for elevating the column shown in Figure 3.

Figure 7 is a plan elevation of the mechanism of Figure 6 except in reduced scale illustrating further details thereof not apparent in Figure 6.

Figure 8 is a plan view, partly in section and partly broken away, taken on the plane of line 8—8 of Figure 3 but viewed from the front of the machine, omitting the ram brake but illustrating the linkage of the power means for actuating the brake members, for locking the column against rotative movement in engaged position.

Figure 9 is a front end elevation, partly in section and partly broken away, taken on line 9—9 of Figure 8, illustrating further details of the linkage means.

Figure 4:
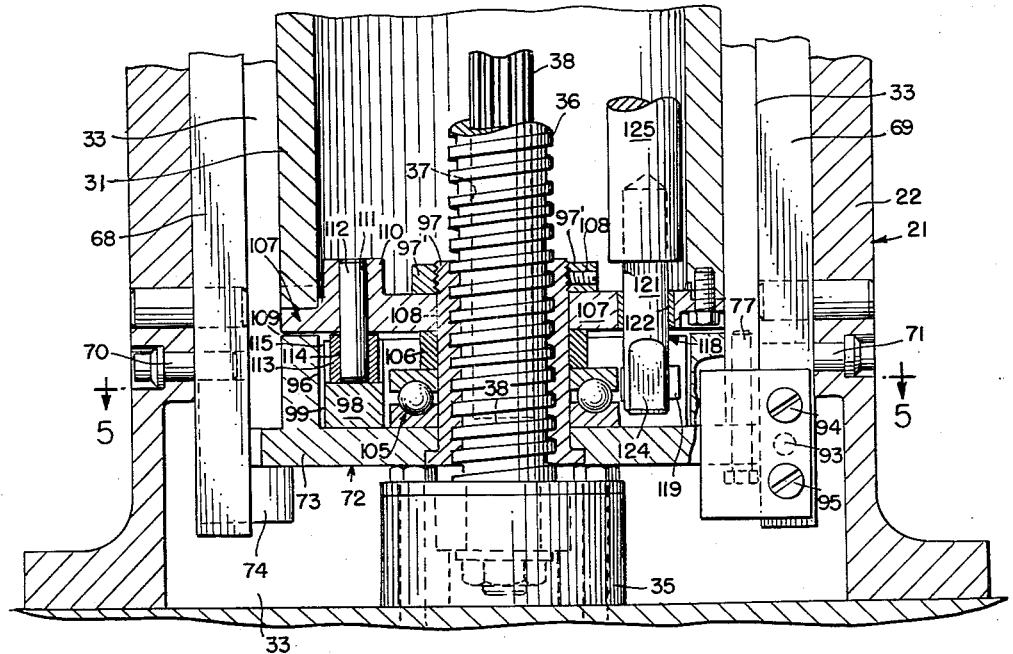
Figure 4 is an enlarged view, in section, showing in detail the mechanism of this invention for locking against rotation the column of a drill press without restricting vertical movement of the column.

With continued reference to the drawings it will be seen in Figures 1 to 3 the numeral 20 indicates a drill press. The press 20 may comprise a stationary frame 21 which may include a generally vertical member 22 mounted rigidly to a base member 23. A conventional movable knee 24 guided by vertical grooves (not shown) in the member 22 is provided for supporting the bed 25. The knee 24 is movable in a vertical direction by means of a conventional jack, generally indicated at 26, anchored to the stationary frame 21. The jack 26 may be controllably operated manually by rotating the hand crank 27 in a conventional manner. The workpiece (not shown) is secured to the upper surface of the bed 25 by means of clamps employing the grooves 28 and 29 in a commonly known manner.

The vertical member 22 of the stationary frame 21 is provided with a large vertical bore 30 (Figure 3) adapted to receive slidably a hollow cylindrically shaped column 31. It will be seen from Figure 3 that the bore 30 is interrupted by the wall section 78 to form recesses 32 and 33. These recesses 32 and 33 are generally provided for manufacturing reasons including reduction in weight and cost. Furthermore the presence of the recesses 32 and 33 tends to reduce the friction against sliding motion between the column 31 and the frame 21 in the bore 30.

While the column 31 is rotatable manually it is raised and lowered by means of a jack, generally indicated at 34 (Figure 3). The jack 34 may comprise a thrust bearing 35 mounted on the frame 21 positioned to support in rotatable relation a vertically disposed jackscrew 36 coaxially with respect to the column 31. Conventional construction of the lower end of the column 31 provides a fixed vertically disposed bore threaded to fit the jackscrew 36 so that upon rotation of the jackscrew 36 the column 31 is moved vertically or axially. However, this conventional arrangement is not employed in the present invention and will be discussed later.

The jackscrew 36 is rotatable but is restrained from axial movement by the thrust bearing 35 as well as the weight of the column 31. Now in order to provide means for elevating the column 31, the jackscrew 36 is provided with an axial splined bore 37 (Figures 4 and 5) opening at the upper end thereof. Disposed vertically and coaxially within the column 31 is a splined shaft 38 extending into cooperative relation within the splined bore 37 of the jackscrew 36. Thus the shaft 38 may move axially but is constrained for rotation with the jackscrew 36.

The shaft 38 extends upwardly and coaxially through the column 31. Rigidly mounted on the top of the column 31 is a laterally disposed support member 39 (Figures 2, 3, 6 and 7). Referring to Figure 6 it will be seen that the support member 39 is provided with a conventional bearing, generally indicated at 40, positioned in journalled relation with the upper portion of the splined shaft 38. A driven sprocket wheel 41 is connected to the upper end of the shaft 38 in drive relation. Mounted on the rear portion of the support member 39 is a power unit indicated at 42. The power unit comprises a reversible electric motor 43 bolted to the support member 39 as at 44 and 45 (Figure 6). The vertically disposed motor shaft 46 is provided with a conventional slip clutch indicated at 47. Mounted on the driven element of the clutch 47 is a pinion gear 48. The purpose of the clutch 47 is to prevent overload of the motor 43 when a predetermined load on the pinion gear 48 is exceeded. When the load is excessive the shaft 46 may rotate relative to the pinion gear 48 as is well known in the art of clutches.

Laterally of the shaft 46 on the support member 39 is mounted a stub shaft 49 extending upwardly. The stub shaft 49 is provided with a sleeve bearing element 50.

A large gear 51 is disposed in journalled relation about the sleeve 50 in meshed relation with the pinion 48. Above and rigidly connected to the gear 51 in drive relation is a sprocket wheel 52, the pin 53 serving as a convenient means for drivenly connecting the sprocket 52 to the gear 51. From Figure 6 it will be seen that the sprocket 52 is in the same plane as the sprocket 41 connected to the splined shaft 38. The sprockets 41 and 52 are connected together in drive relation by a conventional sprocket chain 54 as shown in Figures 6 and 7.

From the foregoing it can be seen that when the motor 43 of the power unit 42 is energized in one direction, the splined shaft 38 is rotated in the direction for elevating the column 31 by the jack 34. Reversed direction of the motor 43 of course results in lowering the column 31.

Referring again to Figures 1 and 2, the support member 39 carries a laterally movable ram generally indicated at 55. The ram 55 conventionally comprises a T-shaped beam or an I-beam 56 having a flanged portion 57 positioned laterally on the underside thereof. The support member 39 has eight rollers, four of which are indicated on one side at 58, 59, 60 and 61 of Figure 2, positioned to receive in rolling relation the flange 57 of the ram 55. Thus the ram 55 is movable in a lateral direction with respect to the column 31. A hand brake controlled by the handle 62 is conventionally provided to lock the position of the ram 55 with respect to the column 31. The crank 63 (Figure 2) operates a conventional gearing arrangement for manually rotating the splined shaft 38 for axially moving the column 31.

The ram 55 also includes a power head generally indicated at 64. The power head 64 contains a motor 65 coupled in journalled relation to a vertically disposed drill head or spindle 66 having a chuck (not shown) disposed on the lower end thereof in drive relation. The chuck is for the purpose of retaining in drive relation a cutting tool or drill as is well known in the art.

The drill head 66 is movable axially on the ram 55 in a conventional manner by manual operation of the handle 67.

Up to this point the foregoing description of the drawings relates to a conventional drill press of the type suitable for employing the brake mechanism of this invention which mechanism will now be described.

Figure 5:
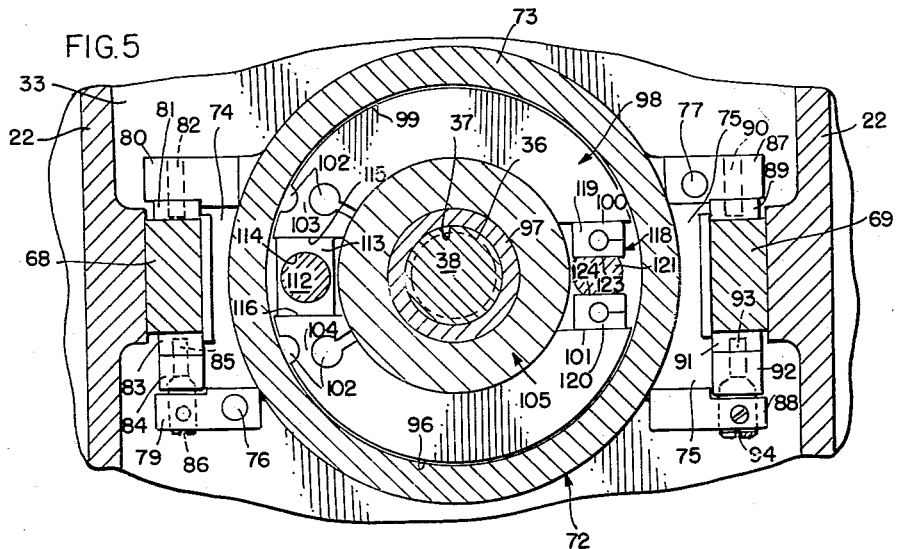
Figure 5 is a horizontal view, in section and partly broken away, taken on line 5—5 of Figure 4, illustrating further details not apparent from Figure 4.

Referring now to Figures 4 and 5 in particular, within the recess 33 of the stationary frame 21, is a pair of diametrically opposed track elements 68 and 69 positioned vertically. The track elements 68 and 69 are secured to the inner walls of the recess 33 in the stationary frame 21 suitably as by drive fit pins two of which are shown at 70 and 71 (Figure 4).

Disposed within the recess 33 below and abutting the lower end of the column 31 is a carrier member generally indicated at 72. The carrier member 72 as a unit is movable in an axial or vertical direction but is nonrotatable and the construction thereof will now be explained.

The carrier member 72 comprises a cup-shaped element 73 having a pair of lobes 74 and 75 extending outwardly in diametrically opposed relation as best shown in Figure 5. Stop pins 76 and 77 extending upwardly are positioned, respectively, on the lobes 74 and 75. The stop pins 76 and 77 serve to limit the upward movement of the cup-shaped element 73 until the pins abut the wall section 78 (Figure 3) of the stationary frame 21.

Referring again to Figure 5 it will be seen that the lobes 74 and 75 are of bifurcated or U-shaped construction. The ears 79 and 80 of the lobe 74 extend outwardly to include the track 68 therebetween. On the inner side of the ear 80 is a bearing element 81 rigidly connected to the ear 80 by pins, one of which is indicated in dotted lines at 82. Thus the bearing element 81 is positioned in slidably engaging relation with the track 68. The ear 79 is also provided with a bearing element 83 positioned in slidable engagement with the track 68. The bearing element 83 is secured rigidly to a vertical bar 84 as by pins, one of which is shown in dotted lines at 85. The vertical bar 84 is adjustably secured to the ear 79 by a pair of set screws, one of which is shown at 86. From this it can be seen that by adjusting the set screws 86 the clearance between the bearing elements 81 and 83 can be adjusted so that the carrier 72 may be moved vertically along the lubricated track 68 in slidable relation. Similarly the lobe 75 is provided with ears 87 and 88 extending outwardly to enclose the track 69 therebetween. On the inner side of the ear 87 is a bearing element 89 rigidly connected to the ear 87 by pins, one of which is indicated in dotted lines at 90. Thus the bearing element 89 is positioned in slidable engagement with the track 69. The ear 88 is also provided with a bearing element 91 positioned in slidable engagement with the track 69. The bearing element 91 is secured to a vertical bar 92 as by pins, one of which is shown in dotted lines at 93. The vertical bar 92 is adjustably secured to the ear 88 by a pair of set screws 94 and 95 as best shown in Figure 4. Again it can be seen that by adjusting the set screws 94 and 95 the clearance between the bearing elements 89 and 91 can be adjusted so that the carrier 72 may be moved vertically along the lubricated track 69. It will thus be evident particularly from Figure 5 that the carrier 72 may move vertically within the recess 33 (Figure 3) but is constrained against rotation by the keyed relation with the tracks 68 and 69.

The inner cylindrical surface 96 of the cup-shaped element 73 is of a character suitable as a friction surface for a braking shoe. Disposed at the center of the cup-shaped element 73 is a sleeve 97 rigidly connected thereto. The internal bore of the sleeve 97 is provided with threads cooperatively engaged with the external threads of the jackscrew 36. Thus when the jackscrew 36 is rotated the carrier 72 moves in a vertical direction.

Within the hollow portion of the cup-shaped element 73 is disposed an expandable brake shoe generally indicated at 98 in concentric relation about the sleeve 97. The outer peripheral surface 99 of the shoe 98 is of friction character and positioned for engaging the friction surface 96 of the cup-shaped element 72. The shoe 98 is of the open type and commences at 100 and extends circular in a counter-clockwise direction to 101 as viewed in Figure 5. The holes and slots 102 are provided in the shoe 98 to augment flexibility thereof at the small sections 103 and 104.

Concentrically disposed about the sleeve 97 and seated on the cup-shaped element 72 is a conventional thrust type ball bearing with race assembly generally indicated at 105. Above the bearing 105 is a collar 106 disposed concentrically about the sleeve 97, as best shown in Figure 4, in journalled relation.

On the lower end of the column 31 is a plate generally indicated at 107 (Figure 4) secured at the periphery thereof to constrain it for rotation with the column 31. Thus the plate 107 moves with the column 31. The plate 107 is provided with an axial bore 108 in journalled relation with the sleeve 97. The plate 107 and the column 31 are thus supported by the collar 106. The longitudinal length of the collar 106 should be sufficient to support the plate 107 and column 31 high enough to provide a small vertical clearance 109 between the lower peripheral face of the plate 107 and the upper peripheral surface of the cup-shaped element 73. A nut 97' is threadedly fit to the upper end of the sleeve 97 to secure the assembly from vertical movement with respect to the cup-shaped element 72. A set screw 108 may be provided in the nut 97' to prevent it from loosening due to its journalled relation with the plate 107. From this it is evident that the column 31 with its associated plate 107 is rotatably carried on the bearing 105.

Referring again to Figure 4 it will be seen that the plate 107 is provided with an upwardly extending boss 110 having a vertical bore 111 therethrough to the lower face of the plate 107. In pressed fit relation in the bore 111 is a stud 112 extending downwardly as shown. Secured to the stud 112 as by press fit, is a slide block 113 having a vertical bore 114 therethrough to receive the stud 112, the slide block 113 being thus fast to the underside of the plate 107. Thus the slide block 113 moves arcuately with the stud 112, plate 107 and column 31 when the column is rotated.

Referring to Figure 5 the brake shoe 98 is provided with an upwardly opening slot positioned in a radial direction and adapted to receive the slide block 113. The vertical walls of the slot in the brake shoe 98 are in slidable relation with respect to the vertical sides of slide block 113. Thus the brake shoe 98 may move slidably in a radial direction along the slide block 113, but arcuate movement of the slide block 113 with the stud 112, plate 107 and column 31 also moves the brake shoe 98 arcuately therewith. The brake shoe 98 must necessarily move arcuately with the slide block 113 because of its vertical walls of the slot are in abutting engagement with the vertical surfaces of the slide block 113. However, the brake shoe 98 can move radially a limited distance. Thus the brake shoe 98 is positioned floatingly except that it may not move arcuately without corresponding arcuate movement of the slide block 113 and column 31. This is to accommodate any eccentricity that might exist between the column 31 and the cup member 72.

In diametrically opposed relation to the slideblock 113 there is provided an actuating means, generally indicated at 118, for controllably engaging and disengaging the brake shoe 98 with respect to the inner cylindrical friction surface 96 of the cup-shaped element 73. Anchored to the vertical faces of the two ends of the brake shoe 98, as indicated at 100 and 101 of Figure 5, in substantially parallel spaced relation is a pair of follower members 119 and 120. In registry with the opening or space between the blocks 119 and 120 there is provided an actuator element 121 extending upwardly through the plate 107 into the hollow of the column 31 as best shown in Figure 4. The actuator element 121 is suitably journalled for rotation with respect to the plate 107 such as by a bearing sleeve 122. The lower end of the actuator element 121 is provided with flat faces 123 and 124 in parallel spaced relation, as best shown in Figure 5, positioned in engaging relation with the flat vertical surfaces of the follower members 119 and 120 respectively. From this it can be seen, in Figure 5, that when the actuator element 121 is moved angularly on its vertical axis the follower members 119 and 120 are moved further apart resulting in the expansion of the brake shoe 98 whereby it engages frictionally with the inner cylindrical friction surface 96 of the cup-shaped element 73 for locking the column 31 with the carrier 72. Thus when the brake shoe 98 is expanded into engagement the column 31 is locked to the cup-shaped element 73 and the column 31 is thereby restricted against rotational movement. Release of the actuator element 121 allows the brake shoe 98 to contract spontaneously into a disengaged position shown in Figure 5 thereby permitting rotative movement of the column 31 with respect to the carrier 72.

At this point it should be observed that when the brake shoe 98 is expanded in engaged relation as above described, flexure of the small sections 103 and 104 thereof tends to move slightly the vertical walls of the shoe 98 abutting the vertical edges 115 and 116 of the slide block 113 in a radial direction which slight motion permits a more uniform engagement with the inner cylindrical friction surface 96 of the cup-shaped element 73. Furthermore this arrangement permits limited compensatory movement of the floating brake shoe 98 due to slight manufacturing variation in coaxial alinement of the column 31 with respect to the cup shaped element 73. Such variation otherwise may be sufficient to cause binding of the column 31 during rotational movement when the brake shoe 98 is in disengaged position as illustrated in Figure 5.

Constrained for rotation with the actuator element 121 on the upper end thereof is a vertically extending control rod 125 within the hollow of column 31. The control rod 125, as shown in Figure 3 extends upwardly through the floor of the support member 39 mounted rigidly on the upper end portion of the column 31 illustrated more in detail in Figure 9. In Figure 9 it will be seen that the floor of the support member 39 is provided with an upwardly extending boss 127 having a vertical bore 128 with a bearing sleeve 129. The sleeve 129 is positioned in registry with the control rod 125 in journalled relation.

Referring now to Figures 8 and 9 it will be seen that at the top end portion of the control rod 125 there is provided a lug indicated generally at 130. The lug 130 abuts the top of the boss 127 and is constrained for rotation with the control rod 125 by suitable means such as a lock pin 131 extending laterally into the control rod 125 as best shown in Figure 8.

The lug 130 may conveniently be comprised of a base member 132 of bifurcated construction which is rigidly connected to the control rod 125 by the lock pin 131 as previously explained. Between the bifurcations of the base member 131 is a crossmember 133 journalled for pivotal movement about the control rod 125 and extending outwardly in a lateral direction as shown in Figure 8. Threadedly fit into the base member 132 is a pair of set screws 134 and 135 positioned in lateral spaced relation for abutting the crossmember 133. By simple adjustment of the set screws 134 and 135 the crossmember 133 may be moved pivotally about the control rod 125 to a predetermined position and tightened to secure the crossmember 133 with the base member 132 and the associated control rod 125 in rigid relation. The outer end portion of the cross member 133 is provided with an elongated opening 136 for a purpose later to be described.

Mounted on the floor of the support member 39 near the lug 130 is a motion imparting device indicated generally at 137 in Figures 8, 9 and 10, the construction of which will be described subsequently.

Figure 10:
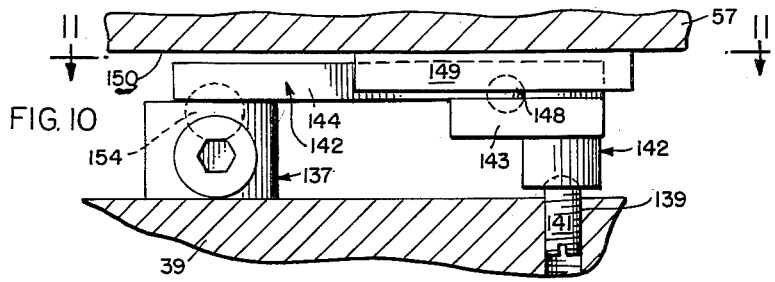
Figure 10 is a sectional view, partly broken away, taken on line 10—10 of Figure 8 illustrating details of the brake for engaging the ram in locked relation with the column.
Figure 11:
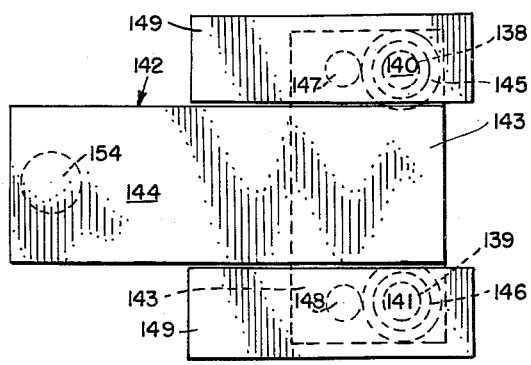
Figure 11 is a plan view taken on line 11—11 of Figure 10 showing further details not apparent in Figure 10.

Reference is now made to Figures 10 and 11. The support member 39 is provided with a pair of vertical bores 138 and 139 in laterally spaced relation. The bores 138 and 139 are threaded for reception of a pair of set screws 140 and 141. The upper ends of the set screws 140 and 141 are hemispherical in shape. Rockably supported on the upper ends of the set screws 140 and 141 is a first lever generally indicated at 142. The lever 142 is T-shaped as shown in Figure 11, the cross element 143 being integral with the lengthwise element 144. The cross element 143 is provided in each end portion thereof with a downwardly extending projection 145 and 146. Each of the two projections 145 and 146 is provided at the lower end with a hemispherical recess in register for reception of the set screws 140 and 141 respectively. Thus the lever 142 may be moved rockably on the supporting set screws 140 and 141.

On the upper surface of the cross element 143 is a pair of laterally spaced recesses adapted to cradle a pair of balls 147 and 148 such as steel in seating relation. It will be noted from Figure 10 that the recesses on the cross element 143 retain less than one-half of the balls 147 and 148. Rockably supported by the balls 147 and 148 are a pair of friction elements 149 positioned just beneath the beam 57 of the ram 55 one on each side wing of the cross element 143. The underside of the beam 57 is provided with a flat friction surface 150 and the friction elements 149 are positioned to engage frictionally the surface 150 of the ram in brake relation. The lower face of each friction element 149 is provided with a laterally spaced recess in register with a respective one of the balls 147 and 148. It will be noted from Figure 10 that the recesses in the friction elements 149 are adapted to retain less than one-half of the balls 147 and 148. Thus abutting the balls 147 and 148 the friction element 149 is rockably supported in spaced relation with respect to the cross element 143 of the lever 142. From this it can be appreciated that as viewed in Figure 10 when the lever 142 is rocked in a clockwise direction about the set screws 140 and 141 the friction elements 149 will rock slightly in a counter-clockwise direction about the balls 147 and 148 for engaging uniformly in brake relation with the flat friction surface 150 of the ram 55. Subsequently when the lever 142 is rocked in a counter-clockwise direction the friction elements 149 are lowered and thereby disengaged from the flat friction surface 150 of the ram 55. This double rocking combination as described above insures uniform pressure of the friction elements 149 against the flat friction surface 150 of the ram 55 in brake relation when the lever 142 is moved in the clockwise direction as viewed in Figure 10. Thus the lever 142 and the friction elements 149, mounted as described, comprise a second brake which when engaged locks the ram 55 with the support member 39 and column 31 so that the ram 55 may not be moved laterally but is secured releasably to the column 31. The means for actuating the lever 142 is the motion imparting device 137 which will now be described.

The motion imparting device 137 (Figures 8, 9 and 10) may be comprised of a block 151 having a lateral bore 152, preferably of rectangular cross-section, positioned beneath and substantially parallel to the end portion of the lengthwise element 144 of the lever 142. The block 151 is also provided with a vertical bore 153 extending from the upper surface thereof downwardly to intersect the lateral bore 152. Disposed in slidable relation within the vertical bore 153 is a ball 154 such as steel. A recess is disposed on the underside of the element 144 of the lever 142 positioned to receive in seating relation the upper portion of the ball 154 as best shown in Figures 9 and 10. Thus when the ball 154 is elevated in the vertical bore 153 it seats into the registered recess of the element 144 to actuate the lever 142 in a counter-clockwise direction for engaging the friction elements 149 with the flat friction surface 150 as previously explained.

Within the lateral bore 152 of the block 151 is disposed in slidable relation an actuator member 155. The rightward end of the actuator member 155 as viewed in Figures 8 and 9 projects a short distance outside of the block 151. A stop element 156 is secured to the rightward end of the actuator member 155 to limit leftward movement thereof. Conveniently the stop element 156 may comprise a washer connected to the end of the actuator member 155 by a bolt 157 threadedly fit into a suitable bore therein. The leftward end of the actuator member 155 extends outwardly from the other end of the block 151 and is pivotally connected at 157 to a laterally movable second lever 158.

Positioned within the block 151, adjacent to the ball or rollable element 154, on the actuator member 155 is a ramp 159 best shown in Figure 9. The ramp 159 is a sloping depression in the actuator member 155 such that when the member 155 is moved rightwardly the ball 154 rolls upwardly on the ramp 159 so that the ball 154 is elevated to project a portion thereof above the block 151 for actuating the lever 142 as previously explained. Subsequently if the actuator member 155 is moved leftwardly the ball 154 rolls down the ramp 159 thereby permitting the ball 154 to recede or retract downwardly in the vertical bore 153. From this it can be seen that movement of the actuator member 155 translates motion to the lever 142 for engaging or disengaging the friction element 149 and flat friction surface 150 of the ram 55. It will at once be appreciated that the ball 154 may be substituted with a non-rollable element having its underside sloped in matching relation with the ramp 159.

As mentioned previously the actuator member 155 is pivotally connected at 157 to a laterally movable second lever 158 as best viewed in Figure 8. On one end portion of the second lever 158 at a short distance from the pivot 157 is a rigidly connected vertical extending projection or pin 160 positioned in engaging relation with the elongated opening 136 of the lug 130.

Positioned in operative relation at the forward end of the support member 39 is an electrically operated solenoid generally indicated at 161. The solenoid 161 is of conventional construction having a stationary core 162 suitably secured to a mounting plate 163 which in turn is secured to the support member 39 such as by bolts 164 and 165 and 165'. The solenoid 161 has the usual electric field coil indicated at 166 connectable to a source of electric energy (not shown) and controlled by a conventional switch (not shown) interposed therebetween. The solenoid 161 is provided with a laterally movable armature 167 pivotally connected at 168 to a rod 169 as shown in Figures 8 and 9. The outer end portion of the rod 169 is pivotally connected at pin 170 to the other end of the second lever 158. Of course it should be understood that other power means such as a fluid operated cylinder may be employed instead of the solenoid 161. The pivot connection 170 may comprise a sleeve 171 slidably fit over the rod 169 which sleeve is pivotally connected to the second lever 158 by an upwardly projecting pin 170 as shown best in Figure 9. The outer end of the rod 169 is provided with lock nuts 172 and 173 threadedly secured thereto. Between the lock nut 173 and the sleeve 171 there is disposed in concentric relation about the rod 169 a compression spring 174. This arrangement provides resiliency between the rod 169 and the second lever 158 so that the armature 167 of the solenoid 161 is not halted too abruptly when the solenoid is energized.

Figure 12:
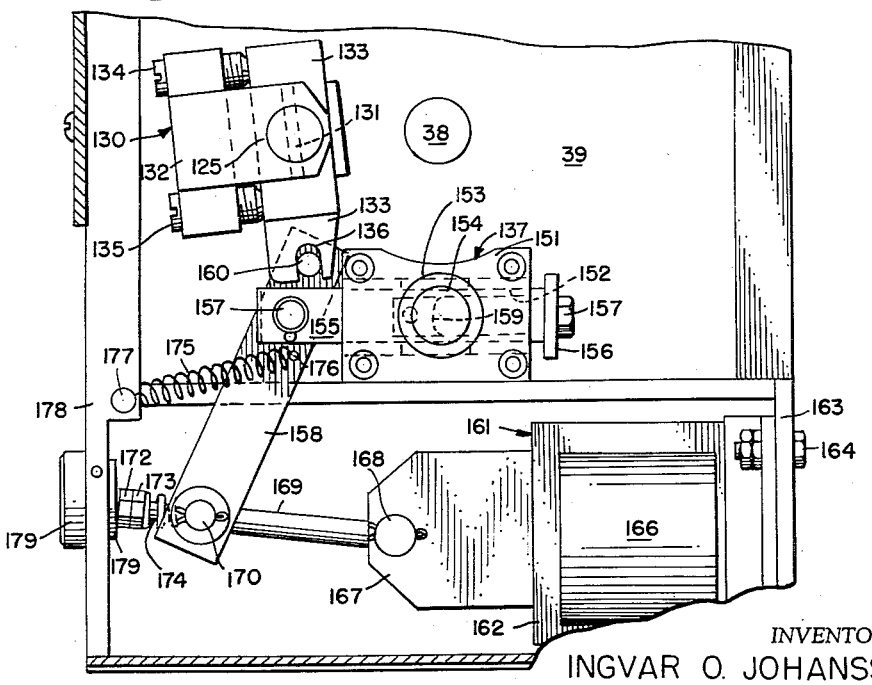
Figure 12 is similar to Figure 8 except it illustrates the position of the linkage when the locking mechanism is disengaged.

When the solenoid 161 is de-energized the means for assisting the return of the second lever 158 from the position shown in Figure 8 to that shown in Figure 12 may be in the form of a tension spring 175 connected at one end 176 to the lever 158 and the other end 177 anchored to the side wall 178 of the support member 39. A resilient bumper 179 may be secured in the side wall 78 in a suitable bore therethrough positioned to receive engagingly the lock nut 172 of the rod 169 when the solenoid 161 is de-energized, the bumper 179 thereby absorbing the shock or impact arising from the action of spring 175.

*Operation*

Referring to Figure 12 it will be noted that the solenoid 161 is de-energized and the second lever 158, lug 130, actuator member 155 are in the position shown. In this condition the ball 154 (Figure 9) is receded into the vertical bore 153 of the block 151. This is because the actuator member 155 is in a leftward position from that shown whereby the ramp 159 is not in registration with the vertical bore 153 and consequently disengaged from the ball 154. The ball 154 being receded or retracted into the vertical bore 153 in the block 151 of the motion imparting device 137 permits the lengthwise element 144 of the first lever 142 to assume a downward position as best shown in Figures 9 and 10. In this position the friction element 149 is disengaged from the flat friction surface 150 of the ram 55. Thus the ram 55 may be moved laterally on the supporting rollers 58, 59, 60 and 61 (Figure 2). At the same time the control rod 125 secured to the lug 130 is in the position illustrated in Figures 4 and 5. With particular reference to Figure 5 the actuator element 121 connected to the control rod 125 permits spontaneous contraction of the brake shoe 98 whereby the shoe 98 is in disengaged relation with respect to the inner cylindrical friction surface 96 of the cup-shaped element 73. Thus the plate 107, stud 112, slide block 113, brake shoe 98, control rod 125 and its associated actuator element 121 are free to rotate with the column 31.

Now when the solenoid 161 is energized the armature 167 thereof is urged retractively in a rightward direction to the position shown in Figure 8. The solenoid 161 and its associated rod 169 moves the second lever 158 in a direction counter-clockwise as viewed in Figure 8. As the second lever 158 begins to move it pivots at first about one of the pivots 157 or 160 according to mechanical advantage depending upon which offers the greatest resistance. Initially the movement of the second lever 158 may be expected to pivot about the pin 160 because the lug 130 and control rod 125 with its associated actuator element 121 aggregately are of greater weight or mass than that of the actuator member 155. Thus the actuator member 155 begins to move rightwardly whereby the ramp 159 engages the ball 154 for elevating it. The elevation of the ball 154 rocks in a counter-clockwise direction the first lever 142 about the supporting set screws 140 and 141 (Figure 10). This rocking movement of the lever 142 elevates the rockable friction element 149 through the seated balls 147 and 148 (Figure 11) whereby the friction element 149 brakingly engages the flat friction surface 150 on the underside of the ram 55 thus locking the ram 55 to the support member 39 on the column 31.

As rightward movement of the actuator member 155 progresses for actuating the second brake as described above, the resistance to movement increases to a point where pivoting of the second lever 158 shifts from the pin 160 to 157 or to a point therebetween. This condition now causes the lug 130 and control rod 125 to move rotatively in a clockwise direction about the axis of the control rod 125 as viewed in Figures 8 and 12. Rotative movement of the control rod 125 also moves rotatively the actuator element 121 of the first brake. Referring back to Figure 5, rotative movement of the actuator element 121 moves the flat faces 123 and 124 which exerts camming action on the follower members 119 and 120 spreading them further apart. The spreading of the follower members 119 and 120 expands the brake shoe 98 whereby it engages brakingly with the inner cylindrical surface 96 of the carrier 72 thereby locking the column 31 with the cup-shaped element 73 of the carrier 72. Thus the column 31 is rendered non-rotative by the actuation of the first brake.

Subsequent de-energizing of the solenoid 161 the brakes will tend to disengage themselves but are further assisted by the action of the tension spring 175 (Figures 8 and 12) urging the second lever 158 in brake release direction. The stop element 156 limits the leftward movement of the actuator member 155 after which further movement of the lever 158 urges movement of the lug 130 in a counterclockwise direction.

It will be observed that when the brake mechanism as above described is either in engaged or disengaged positions, the carrier 72, column 31 and ram 55 are freely movable in a vertical direction by actuation of the jack 34 (Figure 3).

Having thus described a preferred embodiment of the invention, it can now be seen that the objects of the invention have been fully achieved and that it must be understood that changes and modifications may be made which do not depart from the spirit of the invention nor from the scope thereof as defined in the appended claims.

What is claimed is:

1. For a tool machine of the kind described having a stationary frame supporting a cylindrical column rotatable about its axis, said column having a ram carried on the upper end thereof in laterally movable relation; a brake mehcanism comprising a non-rotatable carrier member mounted on said frame adjacent to and positioned coaxially with the lower end of said column, said carrier members supporting said column axially and having an annular friction surface concentric with the column axis, a first brake member mounted on the lower end of said column and extending to said carrier member in releasably engageable relation with the friction surface thereof, a second brake member mounted on the upper end of said column positioned in releasably engageable relation with said ram, and means for actuating simultaneously said brake members whereby said ram is in releasably locked relation with respect to said column and said column is in releasably locked relation with respect to said carrier member in predetermined position.

2. For a tool machine of the kind described having a stationary frame vertically supporting an axially shiftable rotatable cylindrical column, a support member mounted on the upper end of said column, and a laterally movable ram carried by said support member; a brake mechanism comprising an axially movable non-rotatable carrier member disposed in said frame in coaxial abutting relation with the lower end of said column, said carrier member supporting said column axially and having an annular friction surface concentric with the column axis, a releasably-engageable first brake member mounted on the lower end of said column and positioned in engageable relation with the friction surface of said carrier member, a second brake member mounted on said support member and positioned for releasably locking said ram with said support member, and means extending from end to end within said column for actuating said brake members whereby said brake members are actuated simultaneously for locking said column with said carrier member and locking said ram against lateral movement.

3. For a tool machine of the kind described having a stationary frame vertically supporting an axially shiftable rotatable cylindrical column, a support member mounted on the upper end of said column for rotation therewith, and a laterally movable ram carried by said support member; a brake mechanism comprising an axially shiftable non-rotatable carrier member disposed within said frame and positioned in coaxial abutting relation with the lower end of said column, said carrier member supporting said column axially and having an annular friction surface concentric with the column axis, a releasably-engageable first brake member mounted on the lower end of said column and positioned in engageable relation with the friction surface of said carrier member, a first actuating means disposed within and extending from end to end of said column operatively connected for actuating said first brake member, a second brake member mounted on said support member and positioned for releasably locking said ram with said support member, a second actuating means disposed on said machine operatively connected for actuating said second brake member, and means on said supporting member for imparting motion to said first and second actuating means whereby said brake members are simultaneously actuated for locking said column against rotative movement and locking said ram against lateral movement.

4. For a tool machine of the kind described having a stationary frame and an axially movable and rotatable cylindrical column mounted in said frame, a support member mounted on the upper end of said column, and a laterally movable ram carried by said support member; a brake mechanism comprising an axially movable non-rotatable carrier member disposed in said frame and positioned in coaxial abutting and vertically supporting relation with the lower end of said column, said carrier member supporting said column axially and having an annular friction surface concentric with the column axis, a releasably-engageable first brake member mounted on the lower end of said column and positioned in engageable relation with the friction surface of said carrier member, a first actuating means disposed within said column operatively connected for actuating said first brake member, a second brake member mounted on said support member and positioned for releasably locking said ram with said support member, a second actuating means disposed on said machine operatively connected for actuating said second brake member, and means for imparting motion to said first and second actuating means whereby said brake members are simultaneously actuated for locking said column against rotative movement and locking said ram against lateral movement.

5. For a tool machine of the kind described having a stationary frame supporting an axially movable and rotatable cylindrical column, a support member mounted on the upper end of said column, and a laterally movable ram carried by said support member; a brake mechanism comprising an axially movable carrier member disposed in said frame and positioned in coaxial abutting relation with the lower end of said column, said carrier member being constrained against rotation, a friction surface disposed on said carrier member a releasably-engageable first brake member mounted on the lower end of said column positioned in engageable relation with said friction surface, actuating means disposed on said machine operatively connected for actuating said first brake member, a second brake member mounted on said support member, said second brake member positioned for releasably locking said ram with said support member, a motion imparting device for actuating said second brake member mounted operatively on said support member, a lever pivotally connected to said motion imparting device in operative relation, one end of said lever being operatively connected to said actuating means of said first brake member, and power means operatively connected to move said lever in a direction whereby said brake members are simultaneously actuated for locking said column against rotative movement and locking said ram against lateral movement.

6. For a tool machine of the kind described having a stationary frame supporting an axially movable and rotatable cylindrical column, a support member mounted on the upper end of said column, and a laterally movable ram carried by said support member; a brake mechanism comprising a carrier member disposed in axially movable relation in said frame and positioned in coaxial abutting relation with the lower end of said column, said carrier member being constrained against rotation, a friction surface disposed on said carrier member, a releasably-engageable first brake member mounted on the lower end of said column positioned in engageable relation with said friction surface, actuating means mounted on said support member operatively connected for actuating said first brake member, a second brake member mounted on said support member, said second brake member being positioned for releasably locking said ram with said support member, a motion imparting device for actuating said second brake member mounted operatively on said support member, a lever pivotally connected to said motion imparting device in operative relation, one end of said lever being operatively connected to said actuating means of said first brake member, means connected to said support member adapted to urge said lever in a direction to release said brake members, and power means operatively connected to move said lever in the opposite direction whereby said brake members are simultaneously actuated for locking said column against rotative movement and locking said ram against lateral movement.

7. For a tool machine of the kind described having a stationary frame supporting an axially movable and rotatable cylindrical column, a support member mounted on the upper end of said column, and a laterally movable ram carried by said support member; a brake mechanism comprising a carrier member disposed in axially movable relation in said frame and positioned in coaxial abutting relation with the lower end of said column, said carrier member being constrained against rotative movement, a friction surface disposed on said carrier member, a releasably-engageable first brake member mounted on the lower end of said column positioned in engageable relation with said friction surface, actuating means mounted on said support member operatively connected for actuating said first brake member, a second brake member mounted on said support member, said second brake member being positioned engageably with said ram for releasably locking said ram with said support member, a motion imparting device for actuating said second brake member mounted operatively on said support member, said device having a movable actuator member adapted to actuate selectively said second brake member, a lever pivotally supported on said actuator member, one end of said lever being operatively connected to said actuating means of said first brake member, means connected to said support member adapted to urge said lever in a direction to release said brake members, and power means operatively connected to move said lever in the opposite direction whereby said brake members are simultaneously actuated for locking said column against rotative movement and locking said ram against lateral movement.

8. For a tool machine of the kind described having a stationary frame supporting an axially movable and rotatable cylindrical column, a support member mounted on the upper end of said column and a laterally movable ram carried by said support member; a brake mechanism comprising a carrier member disposed in axially slidable relation to said frame and positioned in coaxial abutting relation with the lower end of said column, means disposed on said carrier member and said frame for restraining rotative movement of said carrier member, a friction surface disposed on said carrier member, a releasably-engageable first brake member mounted on the lower end of said column positioned in cooperative relation with said friction surface, actuating means mounted on said support member operatively connected for actuating said first brake member, a flat friction surface disposed on said ram, a second brake member mounted on said support member, said second brake member having a friction element positioned to engage uniformly said flat friction surface to lock said ram with said support member and alternately to disengage said flat friction surface to release said ram from said support member, a motion imparting device mounted operatively on said support member, said device having a movable actuator member adapted to actuate selectively said second brake member, a lever pivotally supported on said actuator member, one end of said lever being operatively connected to said actuating means of said first brake member, means connected to said support member adapted to urge said lever in a direction to release said brake members, and power means operatively connected to move said lever in the opposite direction whereby said brake members are simultaneously actuated for locking said column against rotative movement and locking said ram against lateral movement.

9. For a tool machine of the kind described having a stationary frame supporting an axially movable and rotatable hollow cylindrical column, a support member mounted on the upper end of said column, and a laterally movable ram carried by said support member; a brake mechanism comprising a carrier member disposed in axially slidable relation to said frame and positioned in coaxial abutting relation with the lower end of said column, means disposed on said carrier member and said frame for restraining rotative movement of said carrier member, a friction surface disposed on said carrier member, a releasably-engageable first brake member mounted on the lower end of said column positioned in cooperative relation with said friction surface, an actuator element positioned to engage releasably said brake member for releasably locking said column with said carrier member, actuating means mounted on said support member positioned operatively to actuate said actuator element, a flat friction surface disposed on said ram, a second brake member mounted on said support member, said second brake member having a friction element positioned to engage uniformly said flat friction surface to lock said ram with said support member and alternately to disengage said flat friction surface to release said ram from said support member, a motion imparting device mounted operatively on said support member, said device having a movable actuator member adapted to actuate selectively said second brake member, a lever pivotally supported on said actuator member, one end of said lever being operatively connected to said actuating means of said first brake member, resilient means connected to said support member adapted to urge said lever in a direction to release said brake members, and power means operatively connected to urge said lever in the opposite direction whereby said brake members are simultaneously actuated for locking said column against rotative movement and locking said ram against lateral movement.

10. For a tool machine of the kind described having a stationary frame supporting an axially movable and rotatable hollow cylindrical column, a support member mounted on the upper end of said column, and a laterally movable ram carried by said support member; a brake mechanism comprising a carrier member disposed in axially slidable relation to said frame and positioned in coaxial abutting relation with the lower end of said column, means disposed on said carrier member and said frame for restraining rotative movement of said carrier member, a friction surface disposed on said carrier member, a releasably-engageable first brake member mounted on the lower end of said column positioned in cooperative relation with said friction surface, an actuator element positioned to engage releasably said brake member for releasably locking said column with said carrier member, actuating means mounted on said support member positioned operatively to actuate said actuator element, a flat friction surface disposed on said ram, a second brake member mounted on said support member, said second brake member having a first lever carried by said support member, one end of said first lever being pivotally mounted for rockable movement in a plane substantially perpendicular to said flat friction surface, a friction element pivotally carried on one end of said first lever, said friction element being rockable in a plane substantially perpendicular to said flat friction surface for uniform engagement with said flat friction surface when the other end of said first lever is moved in one direction to lock said ram with said support member and alternately to disengage said friction element from said flat friction surface for releasing said ram when the other end of said first lever is moved in the opposite direction, a motion imparting device mounted on said support member operatively positioned with said other end of said first lever, said device having a movable actuator member positioned to actuate said first lever for selectively engaging said second brake member, a second lever pivotally supported on said actuator member, one end of said second lever being operatively connected to said actuating means of said first brake member, resilient means connected to said support member adapted to urge said second lever in a direction to release said brake members, and power means operatively connected to urge said second lever in the opposite direction whereby said brake members are simultaneously actuated for locking said column against rotative movement and locking said ram against lateral movement.

11. For a tool machine of the kind described having a stationary frame supporting an axially movable and rotatable hollow cylindrical column, a support member mounted on the upper end of said column, and a laterally movable ram carried by said support member, said frame having a recess in the lower portion thereof positioned to receive the lower portion of said column; a brake mechanism comprising a carrier member disposed in axially slidable relation in said recess and in coaxial abutting relation with the lower end of said column, means disposed on said carrier member and said frame for restraining rotative movement of said carrier member, a friction surface disposed on said carrier member, a first brake member mounted on the lower end of said column and extending to said carrier member, said brake member being positioned in engageable relation with said friction surface, said brake member having an actuator element adapted to engage said brake member for locking said carrier member with said column when moved in one direction and alternately disengage said brake member for releasing said column when moved in the other direction, a control rod extending longitudinally in said column, the lower end of said rod being operatively connected to said actuator element and the other end extending through and journalled to said support member, a flat friction surface disposed on said ram, a second brake member mounted on said support member, said second brake member having a friction element positioned to engage uniformly said flat friction surface to lock said ram with said support member and alternately to disengage said flat friction surface to release said ram from said support member, a motion imparting device mounted operatively on said support member, said device having a movable actuator member adapted to actuate selectively said second brake member, a lever pivotally supported on said actuator member, a lug operatively connected to the upper end of said control rod, one end of said lever being pivotally connected to said lug in operative relation, resilient means connected to said support member positioned to urge said lever in a direction to release said brake members, and power means operatively connected to urge said second lever in the opposite direction whereby said brake members are simultaneously actuated for locking said column against rotative movement and locking said ram against lateral movement.

12. For a tool machine of the kind described having a stationary frame supporting an axially movable and rotatable hollow cylinder column, a support member mounted on the upper end of said column, and a laterally movable ram carried by said support member, said frame having a recess in the lower portion thereof positioned to receive the lower portion of said column; a brake mechanism comprising a carrier member disposed in axially slidable relation in said recess and in coaxial abutting relation with the lower end of said column, said carrier member being in keyed relation to said frame for preventing rotative movement thereof, a friction surface disposed on said carrier member, a first brake member mounted on the lower end of said column and extending to said carrier member, said brake member being positioned in engageable relation with said friction surface, said brake member having an actuator element adapted to engage said brake member for locking said carrier member with said column when moved in one direction and alternately disengage said brake member for releasing said carrier member from said column when moved in the other direction, a control rod extending longitudinally in said column, the lower end of said rod being operatively connected to said actuator element and the other end extending through and journalled to said support member, a flat friction surface disposed on said ram, a second brake member mounted on said support member, said second brake member having a first lever carried by said support member, one end of said first lever being pivotally mounted for rockable movement in a plane substantially perpendicular to said flat friction surface, a friction element pivotally carried on one end of said first lever, said friction element being rockable in a plane substantially perpendicular to said flat friction surface for uniform engagement with said flat friction surface when the other end of said first lever is moved in one direction to lock said ram with support member and alternately to disengage said friction element from said flat friction surface for releasing said ram when the other end of said first lever is moved in the opposite direction, a motion imparting device mounted on said support member operatively positioned with said other end of said first lever, said device having a slidable actuator member positioned to actuate said first lever for selectively engaging said second brake member, a second lever pivotally supported on said actuator member, a lug operatively connected to the upper end of said control rod, one end of said second lever being pivotally connected to said lug in operative relation, resilient means connected to said support member adapted to urge said second lever in a direction to release said brake members, and power means operatively connected to urge said second lever in the opposite direction whereby said brake members are simultaneously actuated for locking said column against rotative movement and locking said ram against lateral movement.

13. For a tool machine of the kind described having a stationary frame supporting an axially movable and rotatable hollow cylinder column, a support member mounted on the upper end of said column, and a laterally movable ram carried by said support member, said frame having a recess in the lower portion thereof positioned to receive the lower portion of said column; a brake mechanism comprising a cup-shaped carrier member disposed in axially slidable relation in said recess and in coaxial abutting relation with the lower end of said column, said carrier member being in keyed relation to said frame for preventing rotative movement thereof, an inner peripheral friction surface disposed in said carrier member, an expansible-contractable first brake member mounted on the lower end of said column and extending into said carrier member, said first brake member being positioned in frictionally engageable relation with said inner peripheral friction surface, said first brake member having an actuator element adapted to expand said brake member for locking said carrier member with said column when moved in one rotative direction and alternately contract said brake member for releasing said carrier member from said column when moved in the other rotative direction, a control rod extending longitudinally in said column, the lower end of said rod being operatively connected to said actuator element and the other end extending through and journalled to said support member, a flat friction surface disposed on the under side of said movable ram, a second brake member mounted on said support member, said second brake member having a first lever carried by said support member, one end of said first lever being pivotally mounted for rockable movement in a plane substantially perpendicular to said flat friction surface, a friction element pivotally carried on the upper portion of said one end of said first lever, said friction element being rockable in a plane substantially perpendicular to said flat friction surface to engage uniformly said friction element with said flat friction surface when the other end of said first lever is moved upwardly for locking said ram with said support member and alternately to disengage said friction element from said flat friction surface for releasing said ram when the other end of said first lever is moved downwardly, a motion imparting device mounted on said supporting member operatively positioned with said other end of said first lever, said device having a block with a laterally disposed first bore therethrough, said block having a second bore disposed on the upper portion of said block and extending downwardly into said first bore, an actuator member slidably disposed in said first bore and extending therethrough, a stop element connected to one end of said actuator member for limiting movement thereof in one direction, said actuator member having a ramp positioned adjacent said second bore, a co-operating element positioned in said second bore in engaging relation with said actuator member and said other end of said first lever, said actuator member being slidable in one direction to a position determined by said stop element to retract said co-operating element for releasing said second brake and alternately slidable in the other direction to protract said co-operating element for engaging said second brake member, a second lever pivotally supported on the other end of said actuator member for movement in a lateral direction, a lug connected to the upper end of said first brake control rod, one end of said second lever being connected pivotally to said lug in operative relation, resilient means connected to said support member positioned to urge said second lever in a direction to release said brake members, and power means operatively connected to urge said second lever in the opposite direction whereby said brake members are simultaneously actuated for locking said column against rotative movement and locking said ram against lateral movement with respect to said column.

14. For a tool machine of the kind described having a stationary frame supporting an axially movable and rotatable hollow cylindrical column, a support member mounted on the upper end of said column, and a laterally movable ram carried by said support member, said frame having a recess in the lower portion thereof positioned to receive the lower portion of said column in concentric relation; a brake mechanism comprising a cup-shaped carrier member disposed in axially slidable relation in said recess and in coaxial abutting relation with the lower end of said column, said carrier member being in keyed relation to said frame for preventing rotative movement thereof, an inner peripheral friction surface disposed in said carrier member, an expansible-contractable first brake member mounted on the lower end of said column and extending into said carrier member, said first brake member being positioned in frictionally engageable relation with said inner peripheral friction surface, said first brake member having an actuator element adapted to expand said brake member for locking said carrier member with said column when moved in one rotative direction and alternately contract said brake member for releasing said carrier member from said column when moved in the other rotative direction, a first brake control rod extending longitudinally in said column, the lower end of said control rod being operatively connected to said actuator element and the other end extending through and journalled to said support member, a flat friction surface disposed on the under side of said movable ram, a second brake member mounted on said support member, said second brake member having a first lever carried by said support member, one end of said first lever being pivotally mounted for rockable movement in a plane substantially perpendicular to said flat friction surface, a friction element pivotally carried on the upper portion of said one end of said first lever, said friction element being rockable in a plane substantially perpendicular to said flat friction surface to engage uniformly said friction element with said flat friction surface when the other end of said first lever is moved upwardly for locking said ram with said supporting member and alternately to disengage said friction element from said flat friction surface for releasing said ram when the other end of said first lever is moved downwardly, a motion imparting device mounted on said supporting member positioned in operative relation with said other end of said first lever, said device having a block with a laterally disposed first bore therethrough, said block having a second bore disposed on the upper portion of said block and extending downwardly into said first bore in substantially perpendicular relation, an actuator member slidably disposed in said first bore and extending therethrough, a stop element connected to one end of said actuator member for limiting movement thereof in one direction, said actuator member having a ramp positioned adjacent said second bore, a rollable element disposed in said second bore in engaging relation with said ramp and extending above said block, a seat disposed on the lower side of the said other end of said first lever positioned in seating relation with said rollable element, said actuator member being slidable in one direction to a position determined by said stop element to retract said rollable element for releasing said ram and alternately slidable in the other direction to protract said rollable element for engaging said ram with said supporting member in locking relation, a second lever pivotally supported on the other end of said actuator member for movement in a lateral direction, one end of said second lever having a pin projecting substantially perpendicular therefrom, an adjustable lug connected to the upper end of said first brake control rod, said lug being pivotally connected to said pin, resilient means connected to said support member positioned to urge movement of said second lever in a direction to release said brake members, and power means carried on said support member operatively positioned for urging said second lever in the opposite direction upon energizing thereof whereby said brake members are simultaneously actuated for locking said column against rotative movement and locking said ram against lateral movement with respect to said column.

15. For a tool machine of the kind described having a stationary frame supporting an axially movable hollow cylindrical column, said column being axially rotatable, a support member rigidly mounted on the upper end of said column, and a laterally movable ram carried by said support member, said frame having a recess in the lower portion thereof positioned to receive the lower portion of said column in concentric relation; a brake mechanism comprising a cup-shaped carrier member disposed in axially slidable relation in said recess and in coaxial abutting relation with the lower end of said column, said carrier member being in keyed relation to said frame for preventing rotative movement thereof, an inner peripheral friction surface disposed in said carrier member, an expansible-contractable first brake member mounted on the lower end of said column and extending into said carrier member, said first brake member being positioned in frictionally engageable relation with said inner peripheral friction surface, said first brake member having an actuator element adapted to expand said brake member for locking said carrier member with said column when moved in one rotative direction and alternately contract said brake member for releasing said carrier member from said column when moved in the other rotative direction, a first brake control rod extending longitudinally in said column, the lower end of said control rod being operatively connected to said actuator element and the other end extending through and journalled to said support member, a flat friction surface disposed on the under side of said movable ram, a second brake member mounted on said support member, said second brake member having a first lever carried by said support member, one end of said first lever being pivotally mounted for rockable movement in a plane substantially perpendicular to said flat friction surface, a friction element pivotally carried on the upper portion of said one end of said first lever, said friction element being rockable in a plane substantially perpendicular to said flat friction surface to engage uniformly said friction element with said flat friction surface when the other end of said first lever is moved upwardly for locking said ram with said supporting member and alternately to disengage said friction element from said flat friction surface for releasing said ram when said other end of said first lever is moved downwardly, a motion imparting device mounted on said supporting member positioned in operative relation with said other end of said first lever, said device having a block with a laterally disposed first bore therethrough, said block having a second bore disposed on the upper portion of said block and extending downwardly into said first bore in substantially perpendicular relation, an actuator member slidably disposed in said first bore and extending therethrough, a stop element connected to one end of said actuator member for limiting movement thereof in one direction, said actuator member having a ramp positioned adjacent said second bore, a rollable element disposed in said second bore in engaging relation with said ramp and extending above said block, a seat disposed on the lower side of the said other end of said first lever positioned in seating relation with said rollable element, said actuator member being slidable in one direction to a position determined by said stop element to retract said rollable element for releasing said ram and alternately slidable in the other direction to protract said rollable element for engaging said ram with said supporting member in locking relation, a second lever pivotally supported on the other end of said actuator member for movement in a lateral direction, one end of said second lever having a pin projecting substantially perpendicular therefrom, and adjustable lug connected to the upper end of said first brake control rod, said lug having an elongated opening positioned in pivotal receiving relation with said pin, a tension spring connected to said support member and said second lever in a position for urging movement of said second lever in a direction to release said brake members, and a solenoid carried on said support member pivotally connected to said second lever positioned for moving said second lever in the opposite direction upon energizing thereof whereby said brake members are simultaneously actuated for locking said column against rotative movement and locking said ram against lateral movement with respect to said column.

References Cited in the file of this patent

FOREIGN PATENTS 701,771    Great Britain _____ Dec. 30, 1953